Figure 1:
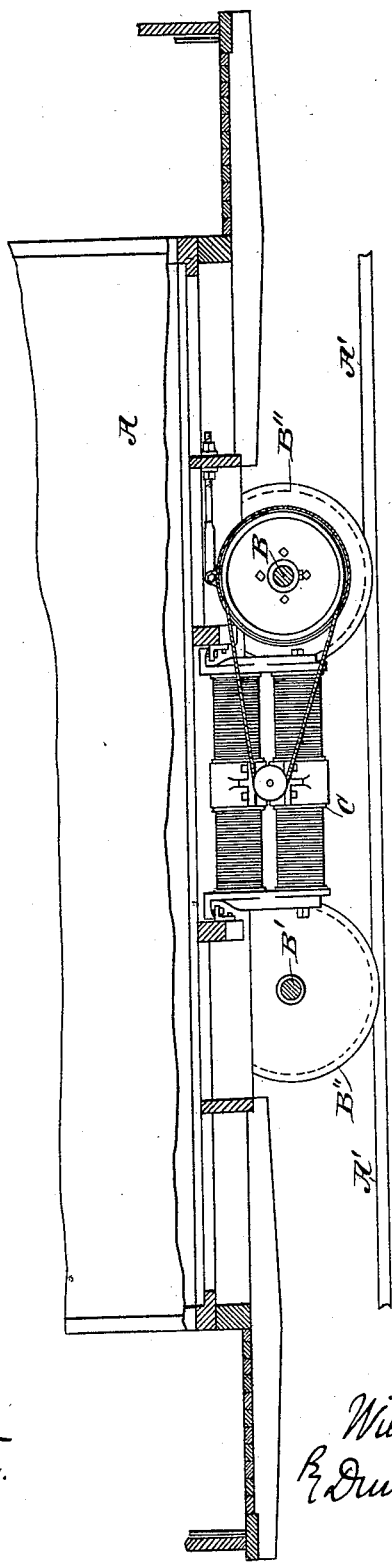

(No Model.) 6 Sheets—Sheet 1.

W. L. STEVENS.
DRIVING GEAR FOR ELECTRO MAGNETICALLY PROPELLED VEHICLES.

No. 394,734. Patented Dec. 18, 1888.

WITNESSES
Robt. F. Gaylord
Frank B. Murphy.

INVENTOR.
William L. Stevens
By Duncan, Curtis & Page
attys.

(No Model.) 6 Sheets—Sheet 4.

W. L. STEVENS.
DRIVING GEAR FOR ELECTRO MAGNETICALLY PROPELLED VEHICLES.

No. 394,734. Patented Dec. 18, 1888.

WITNESSES.
Robt. F. Gaylord
Frank B. Murphy.

INVENTOR
William L. Stevens
By Duncan, Curtis & Page
Attys.

(No Model.) 6 Sheets—Sheet 5.
W. L. STEVENS.
DRIVING GEAR FOR ELECTRO MAGNETICALLY PROPELLED VEHICLES.
No. 394,734. Patented Dec. 18, 1888.

WITNESSES.
Robt. F. Gaylord
Frank B. Murphy.

INVENTOR.
William L. Stevens
By Duncan, Curtis & Page
attys.

(No Model.) 6 Sheets—Sheet 6.

W. L. STEVENS.
DRIVING GEAR FOR ELECTRO MAGNETICALLY PROPELLED VEHICLES.

No. 394,734. Patented Dec. 18, 1888.

WITNESSES.
Robt. F. Gaylord
Frank B. Murphy

INVENTOR.
William L. Stevens
By Duncan, Curtis & Page
Attys.

UNITED STATES PATENT OFFICE.

WILLIAM L. STEVENS, OF BOSTON, MASSACHUSETTS.

DRIVING-GEAR FOR ELECTRO-MAGNETICALLY-PROPELLED VEHICLES.

SPECIFICATION forming part of Letters Patent No. 394,734, dated December 18, 1888.

Application filed March 5, 1888. Serial No. 266,132. (No model.)

*To all whom it may concern:*

Be it known that I, WILLIAM L. STEVENS, a citizen of the United States, residing at Boston, in the county of Suffolk and State of Massachusetts, have invented certain new and useful Improvements in Driving-Gear for Electro-Magnetically-Propelled Vehicles, of which the following is a specification, reference being had to the drawings accompanying and forming a part of the same.

This invention relates to apparatus or devices to be used on any form of car, carriage, or other vehicle which is propelled by an electro-magnetic motor, or to be used in conjunction with an electro-magnetic or similar motor and any kind of driven mechanism where the same or similar conditions obtain.

The invention pertains more particularly to the intermediate mechanism by means of which the movement or rotation of the motor is transmitted or imparted to the driven mechanism.

In describing the invention I shall illustrate it herein as applied to the special purpose of connecting an electro-magnetic motor carried by a street or railway car to the axle or axles on which the wheels are secured, and shall consider it mainly in connection with the special needs of such an application.

In carrying out my invention I have sought to meet as far as possible the practical requirements for the successful operation of street or railway cars by means of electric motors. In these respects my main objects are, first, to provide for the proper reduction of speed, whereby the motor may be run at a relatively high speed, as should be the case to obtain the most economical results; second, to maintain a connection between the driving and the driven mechanism which shall be capable of compensating for any differences in the sizes or relative speeds of the wheels of the two axles, whereby no power may be lost; third, to make the intermediate reducing-gears more simple and in fewer parts and more compact, in order to economize in space and weight, and, fourth, to protect and inclose the gears and bearings, so as to exclude dust and moisture.

The invention involves also other features of novelty which I shall point out more particularly hereinafter.

To accomplish the objects which I have thus generally enumerated, I employ a combination of devices which may be described in the following general terms:

An electro-magnetic motor is placed upon a car in any desired and convenient manner and supplied with current from a battery carried by the car or in other well-known ways, and suitable devices are provided for making, breaking, and reversing and controlling the said current. On one or both of the car-axles is mounted a set or series of reducing-gears, entirely inclosed in a cast-iron or similar casing, except the first member, which is a pulley or drum connected to the motor-pulley by a belt of suitable character, which is carried through suitable openings in the case surrounding the pulley. The reducing-gears are of special construction, consisting, essentially, of a stationary interiorly-cogged wheel, between which and the sleeve to which the drum or pulley is connected are intermediate gears or wheels, which, receiving motion from the sleeve and meshing with the interior teeth or cogs, are caused to impart rotary motion to the axle. Various modifications of the gears are possible, and connections may be made from the motor to both axles, or from one axle to the other; but in such cases the principle of the invention will be found similarly involved. The details of the construction of these parts, the manner in which they fulfill their several functions, and the particular advantages which they secure will be more fully described by reference to the drawings.

Figure 2:
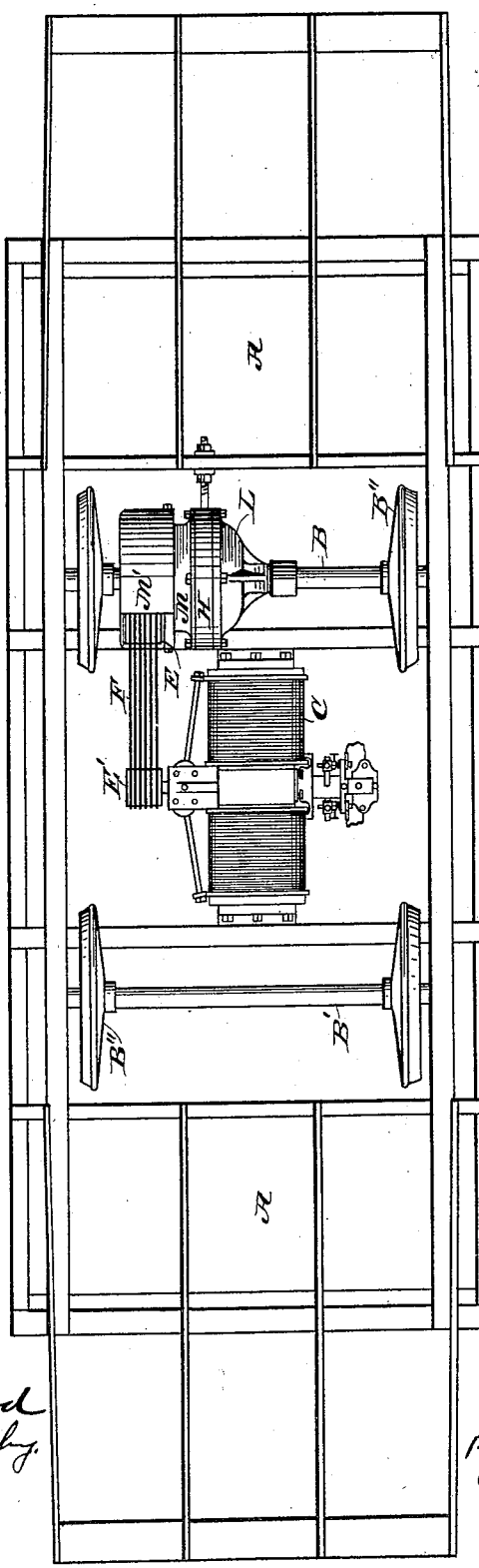
Figure 3:
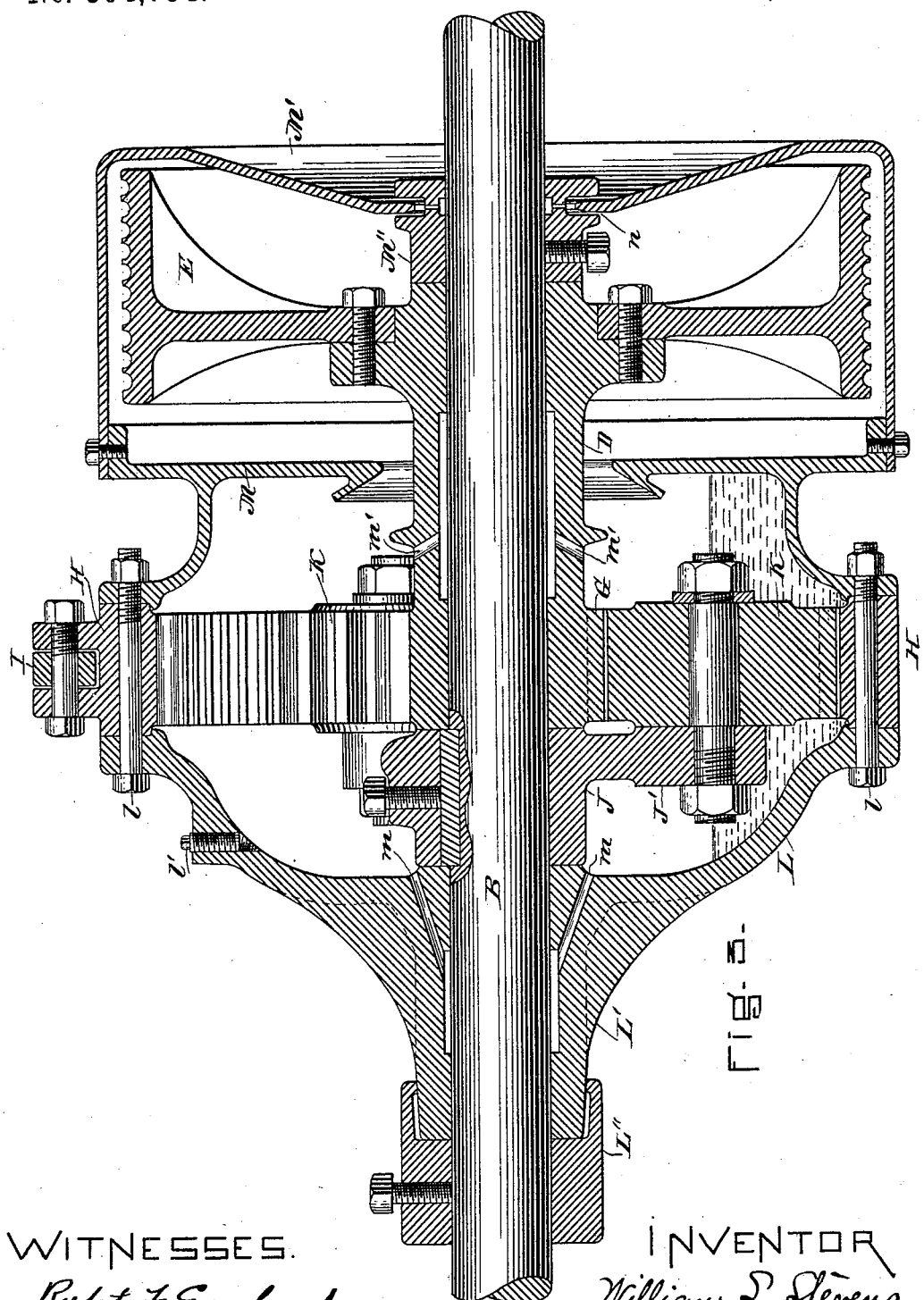
Figure 4:
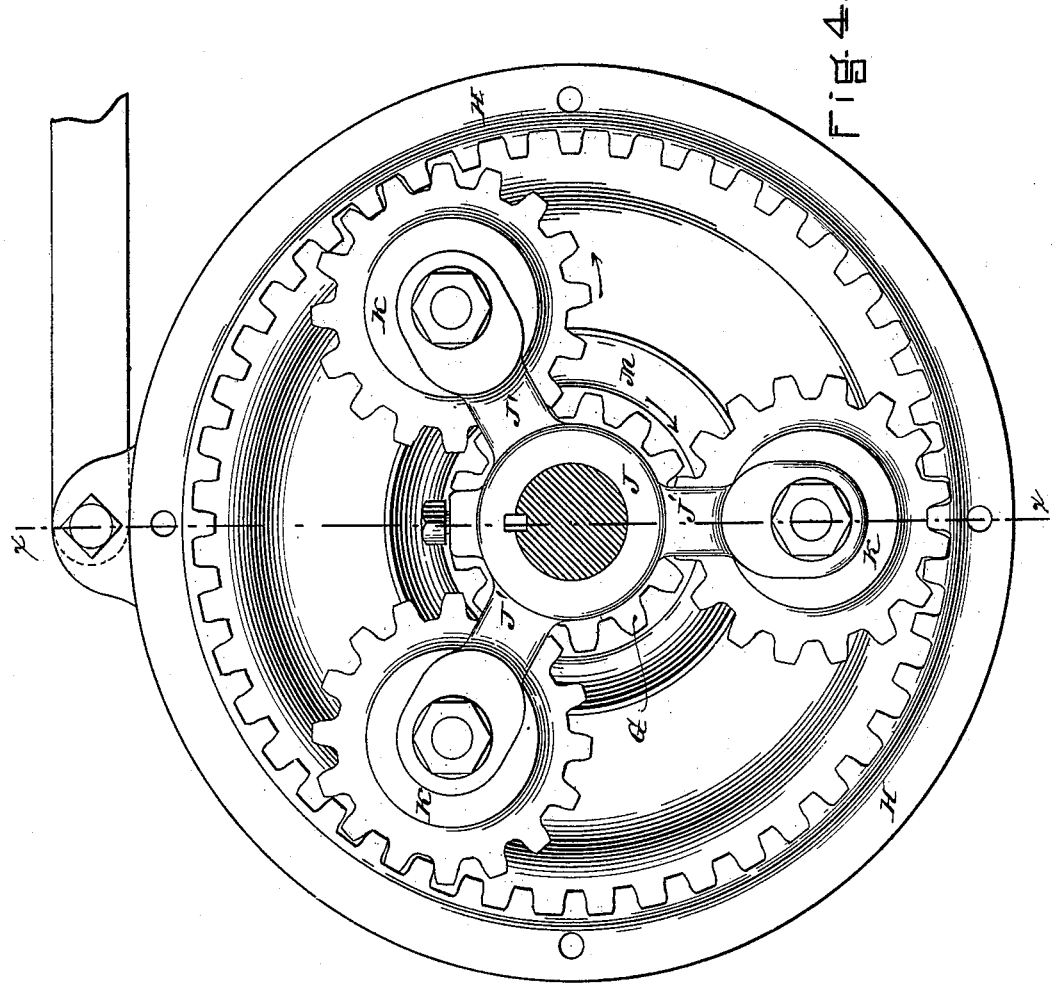
Figure 5:
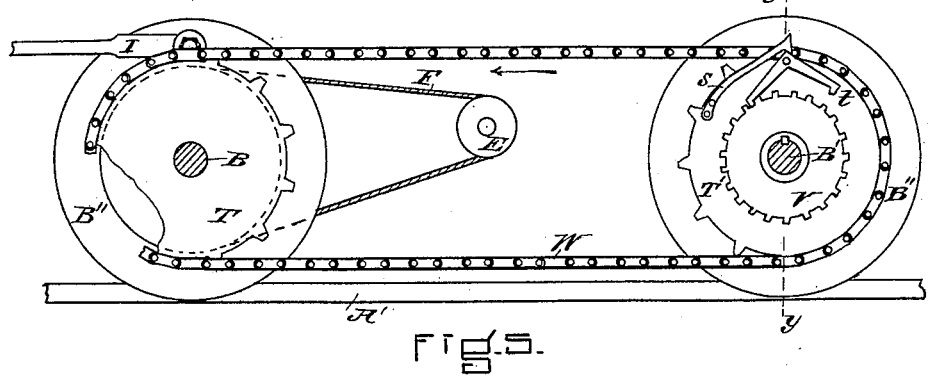
Figure 7:
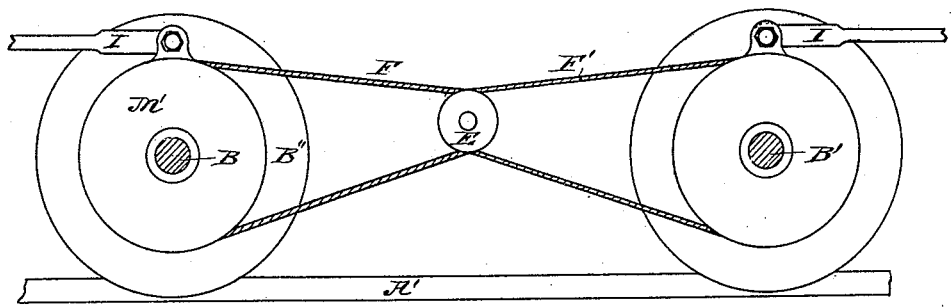
Figure 6:
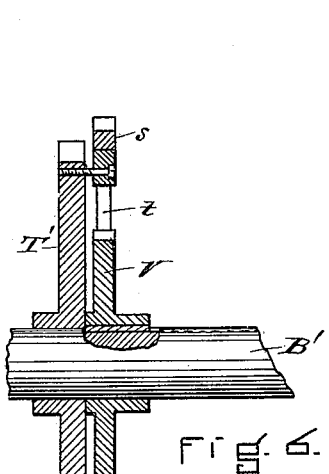
Figure 12:
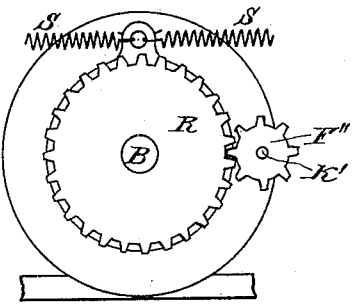
Figure 8:
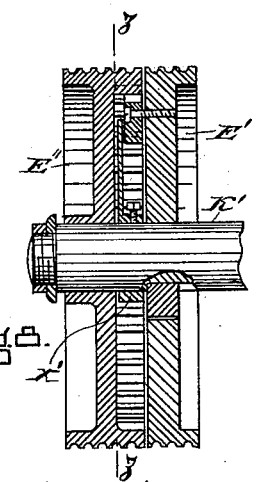
Figure 11:
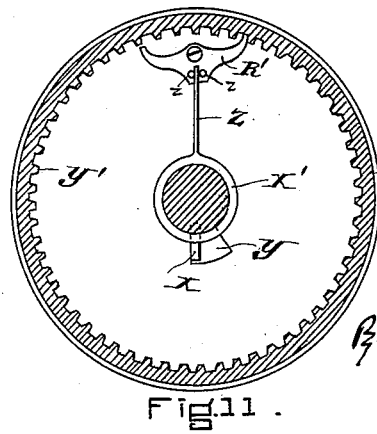
Figure 10:
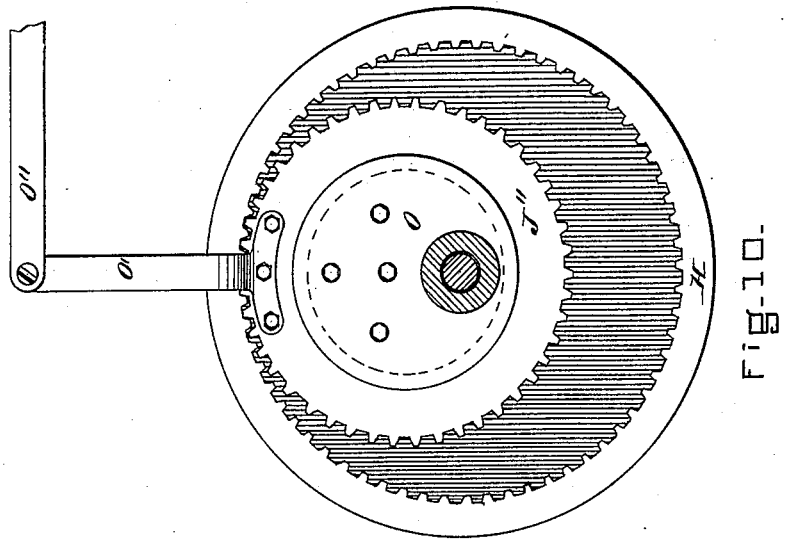
Figure 9:
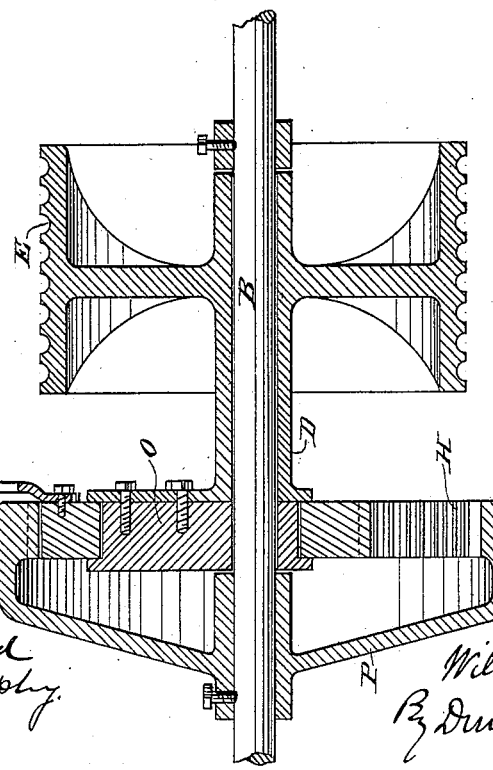

Figure 1 is a view in side elevation of a motor secured under a car and my improved connecting-gears combined therewith. Fig. 2 is a plan view of the under side of a car with the invention applied thereto. Fig. 3 is a sectional detail on line $x\ x$ of Fig. 4 of the reducing-gears. Fig. 4 is a side elevation of the gears without the inclosing box or case. Fig. 5 is a section through the axles, showing in side elevation the devices for imparting the rotation of the axle connected to the motor to the other axle. Fig. 6 is a section on line $y\ y$ of Fig. 5. Fig. 7 is a section through the axles, showing both axles geared to the motor. Fig. 8 is a central vertical transverse section of motor-pulley of Fig. 7. Fig. 9 is a longitudinal central section of a modified form of reducing-gear. Fig. 10 is a section of the modification shown in Fig. 9, taken through the shaft between the pulley and reducing-gears. Fig. 11 is a section on line $z\ z$ of Fig. 8. Fig. 12 is an end view of reducing-gears, forming a modification of that shown in Fig. 3.

A A represent the body of a car or similar conveyance; B B', the axles, and B'' the wheels, which run on suitable tracks, A'. Under the car-body is suspended, or in any suitable manner secured, an electro-magnetic motor, C, the current for driving which may be derived from a battery carried by the car, or from a stationary generator through the rails or other conductor.

On one of the axles, as B, is a sleeve, D, loose or free to turn on the axle, and to it is secured a pulley or drum, E. The pulley E' of the motor is geared to the pulley E by some form of flexible or frictional connection, such as a belt or a number of bands, F, composed of spiral springs of steel, which constitute a yielding connection as distinguished from a positive gearing, and which may give or slip under abnormal strain to prevent shocks and injury to the connections.

The drum E is of greater diameter than the pulley E', so that the speed of rotation of the pulley E and sleeve D is considerably reduced. The inner end of sleeve D is formed or provided with gear-teeth G, concentric with which is a ring, H, with interior teeth or cogs. The ring H is held against rotation by a link or bar, I, secured to the ring and the car-body, respectively.

J is a hub keyed to the axle B, and from it extend one or more, preferably three, arms J', each carrying at its extremity a gear-wheel, K, meshing with the gear-teeth G and the interior cogs or gears on ring H. The number of the teeth G is smaller than that in each of the wheels K, and there may be four or five times as many teeth in H as in each wheel K; consequently one revolution of the arms J' and hub J will require several revolutions of the sleeve D.

L is a cast-metal head, having a central hub, L', surrounding the axle B. The rim or edge of the head L is secured by bolts $l$ to the ring H, forming an oil-tight joint. Over the end of the hub L' is a circular drip-cup, L'', which is secured by a set-screw to the axle, and a screw-plug, $l'$, is inserted in a small opening, in the head to permit the introduction of oil.

A head, M, with a central flanged opening, through which passes the sleeve D, is secured to the opposite edge of the ring H by the bolts $l$, thus completing a casing for the gears which answers as a receptacle for containing oil. In practice this receptacle is partially filled with oil, which occupies the lower portion of the same and through which the wheels K pass. In this way the gears are protected from dust and moisture and thoroughly lubricated. Suitable provision is also made for supplying the oil to the axle-bearings—for instance, by the passages $m\ m$, leading into an oil-space in the hub L', and the passages $m'\ m'$, leading to an oil-space in the sleeve D. A portion of the oil which is carried up by the wheels K in its descent finds its way into these passages and lubricates the axle.

A hood or cover, M', with an opening or openings to permit the belt F to pass through, incloses the pulley E. A collar, M'', with a groove, $n$, is secured to the axle B, and the edge of the central opening of the cover M', entering said groove, forms a dust-joint.

The operation of the devices now described is as follows: Upon the starting of the motor its rotation is smoothly and steadily transmitted to the reducing-gears by the yielding or flexible belt, which, if the strain is too great, gives or slips sufficiently to avoid any injury to the apparatus. It is desirable to have the drum or pulley E much larger than that of the motor to reduce speed; but it is impracticable to reduce speed to an economical extent by means of one belt, owing, mainly, to conditions of space. The advantages, therefore, of both belting and gearing are secured by making the pulley E the first member of a suitable train of gears. In the particular devices described the rotation of the pulley E and sleeve D in one direction imparts a rotation about its axis of each of the wheels K in an opposite direction; but as the gear-ring H, with which these wheels mesh, is stationary, the wheels are carried bodily around the sleeve and impart motion to the axle B in the same direction as the sleeve. The difference in speed between the sleeve D and axle B is thus reduced, so that the wear is comparatively slight.

Without departure from the principle of this invention the construction of the reducing-gears may be considerably varied. Referring, for instance, to Figs. 9 and 10, in which the parts corresponding to those in the previously-described forms of apparatus are designated by similar letters of reference, E is a pulley with a long hub or sleeve, D, turning loosely upon the car-axle B. To the end of the sleeve is rigidly secured the eccentric O, which is also loose upon the axle and turns with the sleeve D. A spur-gear, J'', is mounted loosely upon the eccentric O in practically the same manner as the eccentric-strap of an engine is mounted. The gear J'' partakes of the motion of the eccentric, but is prevented from rotating by the rod O', bolted to it and connected to a link, O'', pivoted to some stationary part of the car-body, so as to be capable of a certain vertical movement.

H is an internal or annular gear, keyed or secured to the axle and concentric to the same by the disk or spindle P. With this gear meshes the spur-gear J''. Under these conditions the rotation of the pulley E and sleeve D will carry the gear J'' around with the eccentric O; but J'' being prevented from rotating, it will cause the gear H to revolve in the same direction as the pulley E, but at a slower speed, determined by the difference between the number of teeth on J″ and H.

It is frequently desirable to impart by some form of gearing the movement of the motor-shaft to both axles of the car. This may be done by driving both axles from the motor-shaft direct, or by communicating the motion of the driven axle to the other by suitable gearing between them.

When both forward and rear wheels are of exactly the same size circumferentially, this presents no great practical difficulties; but the chilled wheels commonly employed on horse-cars are very liable to differ slightly in size. To reduce them to a size by turning them is an expensive proceeding; but to drive two axles having wheels of even slightly-different size by one motor and by the ordinary mechanism is impracticable and involves a great waste of power. Under certain circumstances I have found that nearly or quite double the power was required to drive both axles that was needed for driving one. My improvements in this respect consist in the employment, with the motor and the axles, of intermediate motion-transmitting devices or connections for imparting the motion of the motor-shaft directly or indirectly to both axles, one of which devices is adapted to compensate for differences in the speed of rotation of the wheels of the respective axles. I use the words "motion-transmitting devices" herein with their commonly-accepted and well-understood significance—that is to say, they are the intermediate belts, chains, or any other similarly-operating mechanical elements, which impart the motion of one shaft to any other.

In illustration of the principles involved, I have shown the belts and chains which in practice I have adopted; but the invention is not limited to these devices alone, and in referring hereinafter to motion-transmitting pulleys and belts I wish to be understood as including all such other forms of motion-transmitting devices as are commonly recognized as equivalent elements in similar combinations. To avoid this in one way, I drive one axle, as before, by means of the extensible belt and reducing-gears. To this axle I secure a sprocket-wheel, T, having, say, forty-nine teeth. On the axle B′ is also a sprocket-wheel, T′, having, say, fifty teeth, and not fixed to the axle, but carrying a double-pivoted pawl, t, engaging with a ratchet-wheel, V, fixed to the axle. The pawl t is held up to its work by a spring, s, so constructed that the pawl may be shifted by hand to engage with the teeth of ratchet V on either side of the center. The pawl is shifted by hand when the direction of the car is changed. The two sprocket-wheels T T′ are connected by a sprocket-chain, W.

Assuming the car-wheels to be all of the same diameter and the car moving toward the left, or in the direction of the arrow, the wheels on axle B′ will rotate at the same speed as those on axle B; but the sprocket-wheel T′ would revolve a little slower than the wheel T, or in the proportion of forty-nine to fifty. At every revolution of the wheels on axle B′, therefore, one tooth of the ratchet would pass under the pawl, provided the driving-wheels on axle B do not slip. The least slip of the latter, however, brings the pawl t up against one of the teeth of the wheel V, and power will thus be transmitted from the axle B to axle B′. All the wheels will thus be driven whenever the wheels on axle B slip. On the other hand, assuming the wheels of axle B′ to be smaller than the drivers and the sprocket-wheels of the same diameter, then during one revolution of the drivers more than one revolution of the other wheels would take place, and if the sprocket-wheel T′ were fixed to shaft B′ the result would be to tighten the lower chain below the wheels and cause the rear wheels to slip. This obviously involves a great waste of power; but with the compensating devices described the ratchet-teeth slip under the pawl, and so prevent this tightening of the chain. So, generally, without the equalizing or compensating devices, any difference in the diameter of the drivers and driven wheels will result in a tightening of the sprocket-chain, the side or portion of the chain tightened depending upon which set of wheels is larger, and also upon the direction of rotation.

To make the equalizing device effective, it is necessary, as will be seen from the above, that when no slip occurs there should be a difference in the rate of movement of the driven axle and wheels and the sprocket-wheel mounted on said axle, the normal tendency of the sprocket-wheel being to lag behind. This may evidently be secured by making the two sprockets of equal size and the driving-wheels larger than the others, so that in covering a given length of track the driven wheels will make a greater number of revolutions than the drivers and sprockets, or by making the sprocket-wheel on the driver-axle enough smaller than the other to compensate for any differences in the sizes of the two sets of wheels. This latter plan I have found preferable, inasmuch as slight differences in size are nearly always found in chilled car-wheels, and it is far more convenient to secure the proper equalization by means entirely independent of the relative sizes of the wheels themselves. This difference in the size of wheels, it will be understood, is comparatively slight, and in practice I have found that a difference in diameter in favor of the drivers of one-fourth of an inch resulted in a very considerable saving of power. To properly understand the drawings, therefore, it should be assumed that either the drivers are larger than the other wheels or that the sprocket-wheel on the driving-axle is smaller or has fewer number of teeth than the other. It will also be understood that the object in using the chain or other equivalent gearing between the two axles is not to impart positively at all times the movement of the drivers to the other wheels, but to drive all the wheels when there is need of it, or, in other words, whenever the friction of the drivers is not sufficient to prevent slips and propel the car; and it will be observed of the devices described, as well as those modifications hereinafter referred to, that no power is necessarily transmitted to the wheels on axle B' until a slip of the drivers actually occurs; but such a slip is a natural one and does not require such an excess of power as that which occurs when the system is not provided with the equalizing devices such as shown.

In practice the equalizing devices may be so proportioned, however, that the least slip in the drivers will drive the other wheels, or, in fact, to keep the equalizing devices driving at practically all times.

In lieu of driving one pair of wheels by the other, both may be driven by the motor-shaft by independent belts; but in this case the same objections exist unless an equalizing device be employed. This I accomplish in the manner illustrated in Figs. 7, 8, and 11.

In the other figures both axles, B B', are provided with the reducing-gears shown in Fig. 3, and the motor-pulley is connected to them by the independent belts F F'. The motor-pulley, however, is composed of two parts—one, E", loose upon the shaft, and another, E', secured to the shaft by a key, X, entering a keyway, Y, in the pulley of sufficient width to permit a slight movement or play of the pulley on the shaft. Between the two pulleys, and fixed to the shaft, is a collar, X', from which extends radially a light steel spring, Z, which passes between two pins or lugs, z, set in a double pawl, R', pivoted to the part E' of the pulley and engaging with the ratchet-teeth Y' on the interior of the flange of pulley E". The pulleys E' E" or the gearing on the axles are so constructed that the pulley E" will drive the axle to which it is connected at a very slightly slower rate than the other axle is driven by pulley E'. I would here state that, while not so shown in the drawings, both pulleys should have the same number of grooves and carry the same number of spring-belts. The operation of these devices is as follows: When the motor-shaft begins to turn to the right, as shown in Fig. 11, the collar X' and spring Z operate the pawl R', causing it to engage in the teeth of the ratchet Y'. At the same time the key X encounters the end of the keyway in pulley E', so that the car is driven through the belts and gearing connected to pulley E'. The pawl R' permits the ratchet-teeth to slip under it, one by one, to compensate for the difference in the speed of rotation of the two axles, and under these circumstances no power is transmitted; but the moment any slip of the wheels driven by pulley E' occurs the pawl R' will transmit power through the pulley E" to the other axle.

In practice, to compensate for the differences in the sizes of chilled wheels, which, as has been shown, have a very appreciable effect upon the amount of power required in driving both axles, I make the pulley E" of slightly smaller diameter than pulley E'; but at the same time I endeavor to make the difference between the rates at which the two pulleys or parts of the pulley tend to drive the car so slight that both pulleys will be practically at all times driving, the least slip of the belts or wheels connected with pulley E' being sufficient to bring pulley E" into action.

The difference in the diameters of the two pulleys E" and E' is so slight as scarcely to be perceptible to the eye, even in the full-sized wheels; hence it is not clearly shown in the drawings, which are made to scale.

In Fig. 12 I have shown a pinion, F", on the motor-shaft meshing with a gear, R, mounted on the axle B, and which takes the place of the pulley E of Fig. 3. The motor is thus geared directly to the axle, and the springs S S, which take the place of the link I, Figs. 3 and 5, allow a certain movement of the gears bodily about the axle. This movement should of course be limited.

Having now described my invention, what I claim is—

1. The combination, with the rotary motor of an electro-magnetically-propelled car or other vehicle, of reducing-gears driven thereby and contained in a casing which is carried by the axle of the drivers and secured to the car-body to prevent its rotation, as set forth.

2. The combination, with the driving-axle of an electro-magnetically-propelled car or other vehicle, of speed-reducing gears mounted on the axle, a stationary annular gear or toothed ring concentric with the axle, a box or casing surrounding and inclosing said gears and secured against rotation, and an electro-magnetic motor with motion-transmitting connections between its shaft and the reducing-gears, as set forth.

3. The combination, with the driving-axle of an electro-magnetically-propelled car or other vehicle, of reducing-gears mounted upon the axle, a box or casing containing oil and surrounding and inclosing said gears and secured against rotation by attachment to the car-body, and an electro-magnetic motor carried by the car for driving said gears, as set forth.

4. The combination, with the driving-axle of an electro-magnetically-propelled vehicle, of reducing-gears mounted on and surrounding the axle, a motor, and a belt and pulley for connecting the same with the gears, a stationary oil box or casing mounted on the axle and inclosing the gears, and a dust-protective casing surrounding the pulley and provided with openings for the belt, as set forth.

5. The combination, with the motor of an electrically-propelled vehicle, of motion-transmitting pulleys and belts for imparting the motion of the motor-shaft to both axles of the car, one set of said pulleys and belts being adapted to compensate for differences in the speed of rotation of the wheels of the respective axles, as herein set forth.

6. A mechanism for imparting the motion of the motor to the axles of an electrically-propelled vehicle composed of the following instrumentalities, combined and adapted for operation in the manner set forth, viz: a motor carried by the car or other vehicle, a double or two-part pulley, one part constituting a driving-pulley and capable of a limited movement around the motor-shaft, the other a compensating or equalizing pulley and loosely mounted on the shaft, a double pawl carried by the driving-pulley which meshes with a ratchet formed on the compensating pulley, a spring mounted on the motor-shaft and acting to shift the pawl, whereby the two pulleys are prevented from moving independently in either direction, as may be determined by the action of the spring, and connections for imparting the motion of the pulleys, respectively, to the axles of the car.

7. The combination, with the motor-shaft, of driving and compensating or equalizing pulleys thereon, geared or connected, respectively, to the two axles of the car, the compensating pulley being of smaller diameter than the driving-pulley to compensate for differences in the sizes of the wheels, as set forth.

8. The combination, with the motor-shaft, of the driving-pulley E', having a limited movement around the shaft, the compensating pulley E'', loose upon the shaft and formed with the ratchet-teeth Y' on the interior of its flange, the double pawl R', pivoted to the pulley E' and engaging with the ratchet-teeth Y', and the spring Z, secured to the motor-shaft and adapted to engage with and shift the pawl R', as set forth.

9. The combination, with the driving-axles of electro-magnetically-propelled cars, of a sleeve, D, and pulley secured thereto, a concentric annular gear, H, secured to the car-body, and intermediate gear-wheels carried by a hub, J, fixed to the shaft and meshing with the annular gear and suitable teeth upon the sleeve D, as set forth.

10. The combination, with the sleeve D and pulley E, the concentric gear H, and intermediate gears, K, of the heads L M, secured to the annular gear H, and forming a receptacle for containing oil and protecting the reducing-gears, as set forth.

11. The combination, with the reducing-gears and the inclosing-casing containing oil, of the box or casing M', secured thereto and inclosing the pulley E.

12. The combination, with the sleeve D, loose upon the axle and provided with the lubricating-passages $m'$, of the concentric reducing-gears and inclosing oil box or casing, as set forth.

13. The combination, with the axle of a car, of a pulley loose upon said axle, an electro-magnetic motor for driving said pulley, and a series of reducing-gears between the said pulley and the axle, and adapted to rotate the axle in the same direction as the pulley, as set forth.

WILLIAM L. STEVENS.

Witnesses:
FRANK G. PARKER,
MATTHEW M. BLUNT.